(12) United States Patent
Parks

(10) Patent No.: US 10,911,795 B2
(45) Date of Patent: *Feb. 2, 2021

(54) SYSTEM AND METHOD FOR PROVIDING AN ALERT USING TAGS ON DELIVERING DIGITAL CONTENT

(71) Applicant: Charley Michael Parks, Austin, TX (US)

(72) Inventor: Charley Michael Parks, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/717,143

(22) Filed: Dec. 17, 2019

(65) Prior Publication Data

US 2020/0128284 A1    Apr. 23, 2020

Related U.S. Application Data

(63) Continuation-in-part of application No. 16/153,311, filed on Oct. 5, 2018, now Pat. No. 10,587,933.

(60) Provisional application No. 62/831,121, filed on Apr. 8, 2019.

(51) Int. Cl.
*H04N 21/234* (2011.01)
*G06Q 30/02* (2012.01)
*H04N 21/262* (2011.01)

(52) U.S. Cl.
CPC ... *H04N 21/23424* (2013.01); *G06Q 30/0275* (2013.01); *H04N 21/26241* (2013.01)

(58) Field of Classification Search
None
See application file for complete search history.

(56) References Cited

U.S. PATENT DOCUMENTS

2014/0078039 A1* 3/2014 Woods ............... H04N 21/442
                                                             345/156
2016/0234566 A1* 8/2016 Suoknuuti .......... H04N 21/4307

* cited by examiner

*Primary Examiner* — Omar S Parra

(57) ABSTRACT

The present invention discloses a system and method for providing an alert when an interesting segment is imminent during the delivery of a digital content such as, for example, the beginning of a play during a football game, to direct the focus of one or more viewers towards the digital content. The present invention is further configured to embed a commercial message in conjunction with the alert on directing the focus of the viewers. The alerts and commercial messages are inserted by the use of industry standard tags such as those defined by Society of Cable Telecommunications Engineers (SCTE) standards SCTE 35 and SCTE 104. The tags are subsequently replaced by the required alert and commercial message media files at some point in the delivery path of the digital content. The system is adapted to activate the alert either manually or automatically. Further, the system is optionally implemented with an artificial intelligence (AI) system, which is trained using deep learning to recognize the appropriate time to automatically trigger the alert/commercial message sequence. The AI system could be trained by monitoring the manual control of alert activation.

16 Claims, 5 Drawing Sheets

300

| SEQ # | RTB? | SIZE | LOC | DUR | ADVERTISEMENT URI | ALERT URI | FLAGS |
|---|---|---|---|---|---|---|---|
| 1 | N | 20X10 | 50X80 | 3 | WWW.MYADS.COM/AD001 | NULL | 000 |
| 2 | Y | 15X15 | 60X75 | 6 | NULL | WWW.MYALERTS.COM/ALERT001 | 111 |
| ... | ... | | | | ... | ... | ... |
| ... | ... | | | | ... | ... | ... |
| N-1 | N | 15X15 | 60X75 | 6 | NULL | NULL | 000 |
| N | Y | 20X10 | 50X80 | 3 | NULL | WWW.MYALERTS.COM/ALERT001 | 001 |

FIG. 3

SYSTEM AND METHOD FOR PROVIDING AN ALERT USING TAGS ON DELIVERING DIGITAL CONTENT

BACKGROUND OF THE INVENTION

A. Technical Field

The present invention generally relates to digital content delivery, and more specifically relates to a system and method for providing an alert for a feature of interest within the digital content and then using the heightened attention of the viewers to more efficiently present a commercial message. For the purposes of this application, this combination of alert and commercial is called an attention alert ad.

B. Description of Related Art

For many years, suppliers have advertised their goods and services to the general public in order to increase business and/or distinguish themselves from their competitors. For close to fifty years, television advertising has provided a means to reach millions of potential viewing consumers. Over the years, advertisers have attempted to focus their advertisements towards individuals who are most likely to be positively affected by the ads. On early Saturday mornings, many television ads are often geared towards children who tend to watch the morning programs. On the other hand, during the late evening news, the ads are typically directed to a more mature audience. The technique of targeting is based on crude demographic assumptions.

Viewers of video programs, via television, computer video, mobile device video, broadcast network, cable network, streaming provider or other forms, often become distracted by their environment and may miss significant information. Further, providers of video entertainment, must maintain a balance between recouping their cost of acquiring content and overloading the programming with commercial messages to the point that viewers decide to choose a different means of entertainment. Both NFL (football) and MLB (baseball) leagues are struggling with this issue and considering whether changes are needed to speed game play and/or make the programming more compelling to the viewers.

Although most commercial messages are shown during breaks in a video program's presentation, embedded advertising is also used in several different ways. Blue screen technology is often used to show a static commercial message behind home plate during a baseball game. Corporate logos are sometimes included as a static element included at the top or bottom of the screen during some sports or business programming. Corporate logos also appear on screen between plays in some sporting events, but they are not accompanied by an attention alert.

Some networks will place a promotional graphic on a portion of the screen and call attention to it with an audio chime. This approach is distinct from the present invention in that the audio chime is intended to call attention to the promo rather than to a point of interest within the main program. In fact, the promo usually takes place during short breaks in the action that are not long enough for a 30 second commercial. Emergency broadcast tests and weather warnings use an attention alert to call attention to the main message of the video, i.e., the emergency message, but do not exploit the enhanced attention of the viewers to show a commercial message.

Attention alert ads can increase the revenue generated by a sporting event with no impact on the length of the contest, or they can result in a shorter contest by allowing the removal of conventional commercial breaks until a breakeven point is reached in the ad revenues generated during the event.

Many viewers of broadcast and streaming sports programming will attempt to multi-task. They may be using a second screen device such as a smartphone while viewing a sporting event on a connected TV, or they may be splitting their attention by engaging in a conversation with someone in the room with them. As a result, they may miss the resumption of action in the sporting event unless there is a mechanism to refocus their attention in a just-in-time manner.

Therefore, a clear need exists for a system and method for providing an attention alert ad when interesting content is imminent, for example, the beginning of a play during a football game, to direct the focus of viewers towards the digital content while taking advantage of their heightened attention to show them a brief commercial message.

SUMMARY OF THE INVENTION

The invention comprises the steps of alerting the viewer of a video program that a feature of interest is imminent, then showing them an ad while their attention is heightened. In one embodiment, the two steps of the present invention are accomplished using elements of the Society of Cable Telecommunications Engineers (SCTE) standards SCTE 35 and SCTE 104, along with standards developed by the Interactive Advertising Bureau (IAB) such as the Video Ad Serving Template (VAST) and Open Real Time Bidding (OpenRTB). The following elements are included in this embodiment:

1. When a feature of interest (FOI) is imminent, an FOI detector (human or automated) signals an ad tag formatter, which causes the next record in an ad database to be retrieved and the contents formatted as a SCTE 104 tag that describes the ad. The database contains a series of records, each of which describes the preferred format for an attention alert and commercial that are to be associated with a feature of interest. If the commercial is presold, the record contains a pointer to a file that contains the media for the ad. If it is not presold, the record will indicate that the slot is to be filled via real time bidding (RTB).
2. Unless the commercial is presold and marked as having a self-contained alert, the database record will also indicate that a separate tag is to be created for the insertion of an alert just before the placement of the commercial.
3. The tags are transmitted to an ad tag inserter, which inserts them into the high-definition serial digital interface (HD-SDI) feed that has been received from a video switcher/effects generator.
4. An optional stitcher, with an associated direct ad server, removes the tags that represent presold advertisements and stitches the alert and commercial content into the HD-SDI feed. This step is optional because it can also be accomplished by the infrastructure downstream that handles the ad slots that are not presold.
5. An encoder processes the HD-SDI feed into the desired Adaptive Bit Rate (ABR) formats for transmission, while also converting the SCTE 104 tags into SCTE 35 tags for embedding in the ABR stream.

6. The ABR stream(s) with embedded SCTE 35 tags are transported over a network to an optional Content Distribution Network (CDN) or directly to a group of content servers.
7. Each content server and node of the CDN can divert the audio/video program to a stitcher or server-side ad inserter (SSAI) that has the ability to read the SCTE 35 tags and generate an ad request that is to be fulfilled in this manner:
   a. For presold ads, a VAST ad request can be generated from the SCTE 35 tag.
   b. A VAST ad request also can be generated from the SCTE 35 tag for those alerts that don't require real time bidding. This will generally result in one of a small set of predefined audio files such as a chime or a harp glissando being retrieved from a publisher ad server and merged into the ABR stream.
   c. For ads that need to be sold via real time bidding, an OpenRTB ad request can be used.
   d. In either case (VAST or OpenRTB), the ad request is communicated to a supply side platform (SSP).
   e. The SSP posts the request to an ad exchange or, in some cases, directly to one or more demand side platforms (DSP).
   f. The DSP, which receives the ad request directly or from the ad exchange, determines if the opportunity meets the parameters of any of its ad buyers, and if so, communicates the best bid back to the SSP.
   g. The SSP determines which of the bids it receives from multiple ad exchanges and DSPs is the best.
   h. The SSP communicates the location of the ad and alert content files back to the stitcher or SSAI device.
   i. The stitcher or SSAI device embeds the commercial and alert into the audio/video stream.
8. The ABR program with embedded ads and alerts is returned from the stitcher or SSAI to the content server or CDN node. The program is then transmitted to the next node(s) in the distribution network, which may be another server, CDN node, or a collection of end user devices such as smartphones, connected televisions, and personal computers.

In some embodiments, at least some of the tags are not replaced with ads and alerts until the ABR stream reaches the video player software that is running on the end user device. The ads required for the attention alert commercials are on the complex end of the current spectrum (nonlinear, and potentially nonlinear video), so this type of embodiment may be slow to develop unless mainstream providers such as Roku have implemented the needed capabilities.

In some embodiments, the FOI detector is a human. In these cases, the person will operate one control to indicate that a feature of interest is "pending", meaning expected within 15 to 20 seconds. A second control will be operated to indicate that a feature of interest is "imminent", meaning expected within 8 seconds or less. A third control will be used to signal that the pending or imminent feature of interest has been cancelled. Examples of the need for the third control include the pitcher stepping off the rubber after coming to the set position in a baseball game, or the occurrence of a pre-snap penalty in a football game. The controls may take the form of keystrokes on a keyboard, touch-sensitive icons on a screen, dedicated hardwired switches, or other means that can serve as an input to a digital electronics device.

In some embodiments, the person serving as the FOI detector uses a personal computer running a software application to accomplish the ad tag formatter tasks of retrieving a record describing the next ad from the ad database, formatting the contents of the record as a SCTE 104 tag, and transmitting the tag via TCP/IP to the ad tag inserter. In this embodiment, the process is managed by three keystrokes that are assigned by the application to represent the events "Imminent Feature of Interest Detected", "Pending Feature of Interest Detected", and "Feature of Interest Cancelled." In other embodiments, the ad tag formatter steps are executed by a separate piece of equipment. In these embodiments, the FOI detector communicates the state of the imminent FOI, pending FOI, and cancelled FOI flags to the ad tag formatter.

The current generation of devices that insert SCTE 104 tags into an SDI video stream can accommodate very simple requests via a general-purpose interface (GPI). While this does not currently extend to the type of ad requests needed for this application, that may change in the future. In that future embodiment, the person serving as the FOI detector would be able to push a button that was hardwired to a GPI input on the tag insertion server.

In some embodiments, the feature-of-interest detector is automated. Several technologies can be employed to serve this purpose. In one embodiment, the activation of the alert is implemented with an artificial intelligence (AI) system that has been trained using deep learning to recognize the appropriate time to automatically trigger the pending and imminent feature of interest signals, as well as the signal to cancel a pending or imminent feature of interest. In other embodiments, pattern recognition is employed to recognize the configuration of multiple players, officials, and other game objects that occur just before a play is initiated.

For the purposes of this document, a feature-of-interest detector is defined as either a human operator who operates a control when a feature of interest is imminent or an automated system that performs the same function using a technology such as deep learning, pattern recognition, object recognition, or a rule-based expert system. In any of these cases, the feature-of-interest detector generates a signal(s) that instructs an ad tag formatter to initiate the process of generating the next tag. In one embodiment, the feature-of-interest detector generates a separate signal for each of the pending-feature-of-interest, imminent-feature-of-interest, and cancelled-feature-of-interest conditions.

For the purposes of this document, an ad tag formatter is defined as a piece of commercially available equipment that performs the ad tag formatting function, a piece of custom equipment that performs the ad tag formatting function, or software running on a general-purpose computer that performs the ad tag formatting function. In one embodiment, the tags are formatted using the SCTE 104 specification so that they can be embedded in the vertical blanking fields of the system's baseband video. In this embodiment, signals are received from the feature-of-interest detector using a hardwired connection for each of the pending-feature-of-interest, imminent-feature-of-interest, and cancelled-feature-of-interest conditions. The database in this embodiment is stored in a hard disk drive that is integral to the ad tag formatter, and the formatted tags are transferred to the ad tag inserter via an Ethernet connection.

For the purposes of this document, an ad tag inserter is defined as a piece of commercially available equipment such as the HD492 made by EEG Enterprises, a piece of custom equipment that performs the ad tag insertion function, or software running on a general-purpose computer that performs the ad tag insertion function. For tags that are inserted into baseband video, the metadata comprising the tag will be placed in the vertical blanking area of the video stream and will most often use the format described in the SCTE 104 specification. If tags are inserted after the video has been encoded, they will generally use the SCTE 35 format and will be inserted between the video fragments that comprise the digital video that is being transmitted.

For the purposes of this document, a distribution network is defined as a network that can transport digital video in at least one of baseband and encoded formats. It can be wired or wireless. The network can be homogenous or can combine more than one method of transport such as Ethernet, Asynchronous Transport Mode, Code Division Multiple Access, Global System for Mobile Communications, WiFi, and similar protocols that are used to deliver streaming video. It can also use techniques such as radio frequency quadrature amplitude modulation, satellite links, and microwave links to deliver video over cable TV and satellite TV systems.

For the purposes of this document, an ad inserter is defined as any of the several devices that can read ad tags and replace them with the media files that are referenced by the tags. This currently includes the stitchers of FIGS. 2 and 4, the server-side ad inserter of FIG. 4, and the ad server software embedded in the video players running on the viewer devices (phone, CTV, and PC) of FIG. 4.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The embodiments herein will be better understood from the following detailed description with reference to the drawings, in which:

FIG. 3 shows an embodiment of the structure of the ad database entries that are used to generate the SCTE 104 ad and alert tags.

DETAILED DESCRIPTION OF THE INVENTION

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention discloses a system and method for providing an alert when an interesting segment of a digital content is imminent, for example, the beginning of a play during a football game, to direct the focus of one or more viewers towards the digital content. The present invention is further configured to embed a commercial message in conjunction with the alert on directing the focus of the viewers. The alerts and commercial messages can be inserted into the digital content using industry standard tags (metadata that describe the alerts and commercial messages), which are replaced by the media files that contain the audio, video, and haptic content at an appropriate node in the delivery path of the digital content.

Figure 1:
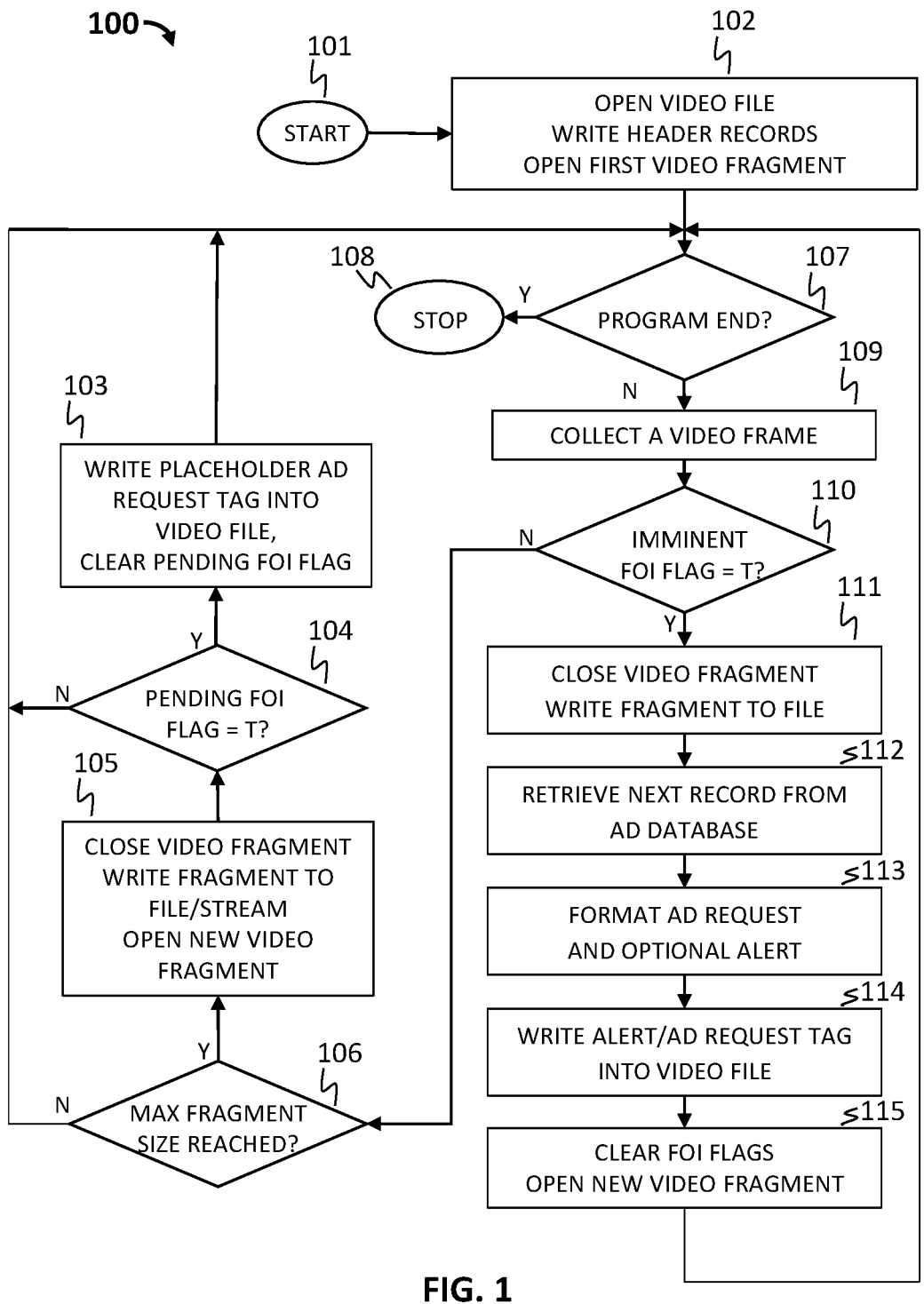
FIG. 1 is a flow chart that describes an embodiment of the process by which tags are embedded in the stream of an encoded audio/video program to indicate where attention alerts and their associated commercials should be inserted.

FIG. 1 shows a flow chart 100 of an embodiment of the process of recognizing when a feature of interest is about to occur in an audio/video program and the steps that are taken when that determination is made. Due to technical requirements of the process of retrieving and displaying supplemental materials like ads during such a program, two stages are included in the feature-of-interest detection process. The first, described as a "pending" feature of interest, occurs when the feature-of-interest detector 201 determines that an FOI is likely in less than 20 seconds. The second case, called an "imminent" feature of interest, occurs when an FOI is expected in less than 8 seconds. This embodiment of the flow chart 100, with its references to video fragments and waiting to insert a tag until the end of a fragment has been reached, primarily deals with the case of inserting tags into video that has been encoded for transmission. The procedure for the baseband video case is much simpler: when a feature of interest is detected (pending or imminent), the tags are inserted into the vertical blanking area of the next frame.

The flow chart 100 begins when the video switcher/effects generator 205 sends a request to the ad tag inserter 204 to begin processing a video program that it will be sending to the ad tag inserter 204. This results in the start of an audio/video program in step 101, which in this context is often a live program such as a sporting event. When streaming of a live audio/video program is started in some embodiments, initialization steps 102 are performed, comprising: opening a video file, creating required header records, and opening the first video fragment (all of which are done using one of several available standard formats for adaptive bit rate streaming, such as MPEG DASH). After the initialization steps 102 have been completed, the ad tag inserter 204 enters a loop in which it performs step 107, checking for an end of file indication from the video switcher/effects generator 205. If the program has ended, stop state 108 is entered. Otherwise, step 109 is entered. After each frame of video is accumulated from the video switcher/effects generator 205 via an HD SDI stream in step 109, a decision is made as to whether it should be the last frame in the current fragment. The first criteria in making that decision is to determine in step 110 whether an imminent feature of interest has been detected. If so, the current fragment is closed and written to a file in step 111 without adding any new video frames so that the latency can be minimized between the detection of the FOI and the insertion of the attention alert and the associated commercial message.

Information is retrieved from a database 203 in step 112 describing the alert that will be used to signal the viewer that a feature of interest is imminent and the ad that will accompany the alert. This information is used in step 113 to create tags for the attention alert and ad, which are inserted by ad tag inserter 204 into the audio/video stream after the truncated fragment in step 114. At this point, a new video fragment is opened in step 115 that will receive the next frame of the program.

If there is no imminent FOI after a video frame has been collected, but step 106 determines that the desired maximum size of a fragment has already been reached, the current fragment is closed and written to the stream or file in step 105. A new fragment is also opened, and the new frame is written to it.

After each fragment is closed, the system checks for a pending FOI in step 104. If one has been detected, tags representing the desired attention alert and ad are written to the stream in step 103. Placing these tags in the stream earlier in time than the imminent FOI tags causes the required media files to be pre-fetched by the server or video player that will ultimately stitch in the alert and ad. This decreases the minimum latency between the placement in the stream of the "imminent" tags and the occurrence of the attention alert and ad in the video program. In this embodiment, video fragments are limited in length to about 2 seconds so that the placeholder tags can be inserted without unacceptable delay. The difference between the 20 second window for the pending FOI and the 8 second window for the imminent FOI still gives sufficient margin for the media files to be pre-fetched well before they are needed.

Cancellation of a pending FOI is not shown in the flow chart to simplify the presentation of the main flow. However, such an event may be common in some types of video programs. For instance, a pending FOI alert may be issued when a baseball pitcher steps on the rubber or a football team breaks the huddle. If a timeout is then called, the expected FOI will not happen. Standards such as SCTE 104 and SCTE 35 provide means to signal that an event such as an ad break should be cancelled, and this mechanism is used in some embodiments when a pending FOI is cancelled.

Figure 2:
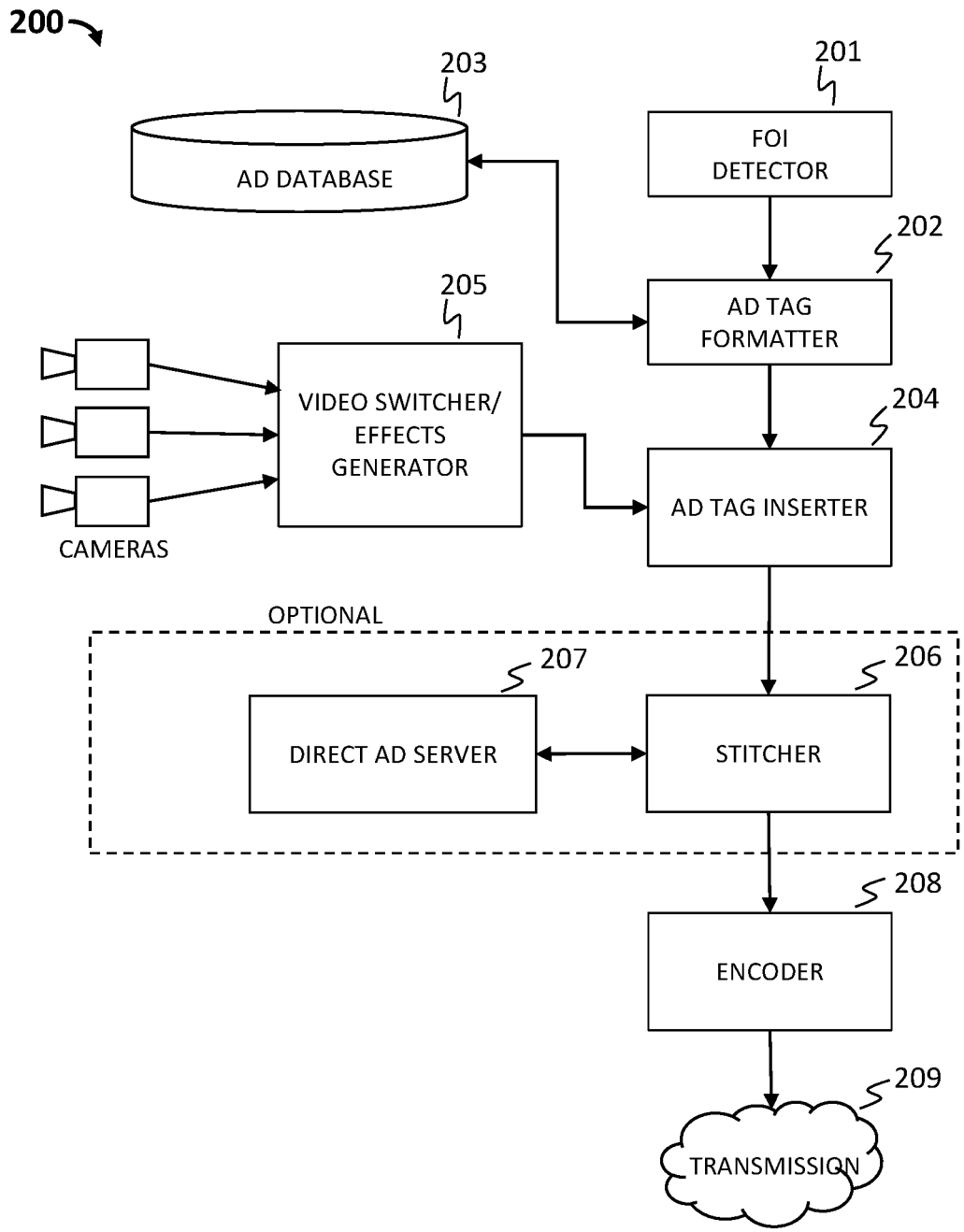
FIG. 2 is a block diagram of an embodiment of the system used to generate SCTE 104 tags for attention alerts and their associated commercial messages, embed the tags in the HD SDI video feed, optionally stitch the presold ads into the HD SDI video feed, encode the HD SDI feed into one or more ABR streams while transforming the remaining tags to SCTE 35 format, and transmit the resulting streams for consumption by viewers.

FIG. 2 is a block diagram 200 describing one embodiment of the system used to embed attention alert tags and commercial tags in a video stream, replace some of the tags with the media files they represent, and encode the data in a format suitable for transmission over a network. The chosen transmission format is most often one of the adaptive bit rate standards such as MPEG DASH, HTTP Live Streaming, Microsoft Smooth Streaming and other similar formats.

In some embodiments, the feature-of-interest detector 201 is a human operator. In other embodiments, feature of interest detection is done by automatic means such as:

1. An artificial intelligence (AI) system that has been trained using deep learning to mimic the actions that would be taken by a person in that situation.
2. A pattern recognition system that analyzes the relative positions of a number of key objects in the frame, such as particular players in a team sport.
3. An object recognition system that looks for one object, such as a quarterback's hands that have been placed together in a hand clap or a pitcher's throwing hand hidden in his glove.
4. A rule-based expert system that bases its decisions on a set of conditions that have been explicitly programmed into it versus having been learned via observing a large sample set. For instance, a feature of interest is considered to be imminent if:
   a. The catcher in a baseball game has signaled for a pitch, and
   b. The pitcher has nodded his assent.

When a feature of interest has been detected in some embodiments, an ad tag formatter 202 will retrieve a record from a database 203 that describes the form that the associated attention alert and ad should take. In most cases, the ad should be an overlay that occupies a portion of the screen while the action taking place in the main program can still be seen on the reminder of the screen (this is called a non-linear ad in the programmatic ad industry.) The database record describes:

1. The size of the overlay window for the commercial
2. Where it should appear on the screen
3. The commercial's duration
4. Whether the ad has been presold or should be put out for a bid
5. Whether an attention alert should accompany the commercial
6. The allowable formats for the commercial (e.g., image, rich media, video)
7. The locations of the commercial and attention alert media files The size and location of the overlay window can be specified as a number of pixels or as a percentage of the overall screen size. The timing of the attention alert and ad are inferred from the timing of the feature of interest detection, with the desired lead time programmed into the ad tag formatter 202. SCTE standards suggest a four second minimum lead time between the receipt of a tag by an ad server and the insertion of the ad media in the video stream, but instruct that best efforts be made to accommodate a shorter time. Implementers will balance the reliability that would result from providing the full four seconds with the added difficulty of detecting the imminent feature of interest at an earlier point in the sequence of events of a live event such as baseball game.

Embodiments of the ad tag formatter 202's interfaces can take several forms. The communication of the feature of interest detection to the ad tag formatter 202 can be via a dedicated general-purpose interface (GPI) such as a parallel port pin to which a hardwired switch is attached. In this case, closing the switch's contacts would indicate to the formatter 202 that the next tag(s) should be formatted and communicated to the ad tag inserter 204. This form of communication would require three switches and three parallel port pins in some embodiments, to provide for signaling a pending feature of interest, an imminent feature of interest, and the cancellation of a pending feature of interest.

Communication of the state of the feature-of-interest detector 201 to the ad tag formatter 202 could also be done via general purpose optical connections, a bus, or a network connection. Depending on the proximity of the FOI detector 201 to the ad tag formatter 202, either an internal computer bus format or an external format might be required. Examples of the former would include ISA, Extended ISA, MicroChannel, Multibus, NuBus, STD80, STD32, PCI104, and VESA Local Bus. Examples of the latter would include HIPPI, IEE488, PCMCIA, CAN, eSATA, IEEE1394, Lightning, RS232, and USB. For a network connection, Ethernet would be an obvious choice, but others could be used such as existing cellular standards up to and including 5G, or other computer standards such as WiFi.

The interface between the ad tag formatter 202 and the ad database 203 can also take one of many forms. In many embodiments, the ad tag formatter 202 will be implemented as software running on a general-purpose computer or server. If the database 203 resides on a storage device that is integral to such a computer, the interface will be chosen by the computer's designer from such industry standards as parallel ATA, SATA, and SAS. If the database 203 is stored remotely, it will be accessed in most embodiments by use of a network protocol such as Ethernet, WiFi, 5G or other similar formats.

The interface between the ad tag formatter 202 and ad tag inserter 204 can also take more than one form. Some existing equipment capable of SCTE tag insertion, such as closed captioning boxes like the HD492 made by EEG Enterprises, can be triggered either by a GPI input or a message received over a network connection. However, the existing generation of such equipment is not designed to handle complicated messages like the insertion of an overlay advertisement by means of a GPI trigger. So, early adopters will have to use the network connection approach or design their own solution, until the hardware manufacturers develop such a capability. For some embodiments, this will result in messages instructing the insertion of a tag being formatted according to SCTE 104 and then communicated to the ad tag inserter 204 via a TCP/IP connection.

The ad tag formatter 202 uses the information retrieved from the database 203, along with the timing of the receipt of a signal from the feature-of-interest detector 201, to generate properly formatted tags to describe the ad that is to be inserted into the video stream and the attention alert that will accompany it. One embodiment formats the tag using the SCTE 104 standard. In SCTE 104, messages are sent via the splice_info_section. The appropriate splice_info_section command for use in generating the tag is the time_signal( ) command, which can utilize descriptors that vary according to the type of ad that is being described. The segmentation_descriptor( ) is an implementation of a splice_descriptor( ). It provides an optional extension to the time_signal( ) command that allows for segmentation messages to be send in a frame accurate method. The segmentation_descriptor( ) contains a segmentation_type_id field that can specify the type of ad break to be inserted. For the non-linear, overlay type of ads needed in the present invention, the two segmentation_type_id values of interest are the provider overlay placement opportunity and the distributor overlay placement opportunity.

The time_signal( ) message should be sent at least 4 seconds in advance of the signaled splice_time to permit the ad tag inserter 204 to place the splice_info_section( ) accurately. However, if the time_specified_flag is set to 0, the command is interpreted as an immediate command. Using it in this manner will cause an indeterminate amount of accuracy error, but would allow the feature of interest to be flagged by the FOI detector 201 at the latest possible point in the video.

Many embodiments of the ad tag inserter 204 will operate on video that is still in its baseband format. This may commonly take the form of the High-Definition Serial Digital Interface (HD-SDI) that is defined in SMPTE 292M. The HD-SDI standard allows the embedding of ancillary data and metadata in the horizontal blanking (HANC) and vertical blanking (VANC) portions of the video signal. Audio data are commonly placed in the higher bandwidth HANC fields, while metadata like SCTE tags are commonly placed in the lower bandwidth VANC fields. HD-SDI is clocked at 1.485 gigabits per second and is commonly transmitted over low-loss digital video grade RG6-style coaxial cable for distances approaching 100 meters. However, it can also be routed through fiber optic cable for much longer distances. Most ad tag inserter 204 embodiments will choose one of these options for both the input connection from the video switcher/effects generator 205 and the output connection to the optional stitcher 206 or the encoder 208.

The stitcher 206 in FIG. 2 is depicted as optional. In embodiments that include the stitcher 206, it will remove at least some of the SCTE 104 ad tags from the VANC fields of the HD-SDI stream, and insert the required ad and attention alert media into the locations specified by the removed tags. The media files are retrieved from the direct ad server 207 using the locations specified in the tags. In one prototypical case, the alert tag calls for a 500-millisecond audio clip of a harp glissando and the ad tag calls for the logo of an advertiser to appear on a portion of the screen for 3 seconds, with an offset between the alert and the ad of 400 milliseconds.

In embodiments that include the optional stitcher 206 co-located with the ad tag inserter 204, the only ads that are stitched into the audio/video stream by optional stitcher 206 are presold ads that are destined for viewing by everyone. Tags that will call for the replacement of low priority provider ads with higher priority distributor ads, and tags that call for real time bidding, are left in place to be handled further downstream in the video distribution infrastructure. The downstream ad serving process is becoming more reliable over time, but has yet to approach 100% reliability. Especially given the fact that some embodiments may attempt to squeeze the 4 second lead time between tag and ad delineated in the SCTE standards, the use of a provider overlay placement opportunity tag format could yield consistently better results as compared to the use of the distributor placement opportunity format. Embodiments that use a stitcher 206 co-located with the ad tag inserter 204, with a tight coupling to a local direct ad server 207, will have significant advantages over the use of a distributor overlay placement opportunity tag format at a randomly chosen node a few hops downstream from the ad tag inserter 204. In effect, using this optional local stitcher 206 will add to the costs of the infrastructure, but may increase revenues by making the appearance of the ads more reliable in a premium position that is a second or two nearer to the feature of interest.

The process of stitching an overlay ad into a video stream can be accomplished via two conceptually simple steps. First, the images that are to serve as the overlay are mapped into the required size by stitcher 206. For instance, if the ad is to appear in the middle of the screen and use a 192×108 pixel subset of a 1920×1080 pixel picture, the ad images first need to be mapped into the 192×108 pixel format from one of the available resolutions contained in the ad media file(s). For this example, assume that a version is available with 4 times as many pixels in a 384×216 pixel configuration. The remapping is done by computing an average chroma and luminance value for each 2×2 block of pixels. After this mapping, a spatial anti-aliasing post processing step may be required to eliminate jagged diagonal lines and other visual artifacts that result from the averaging process.

In the second step of the stitching process, the remapped pixels are merged by stitcher 206 into the main video content that then serves as the background for the overlay. In this example case, the averaged, anti-aliased values are written by stitcher 206 into array locations that represent lines 486 through 593 and columns 864 through 1055 of the 1920× 1080 pixel picture. This process is repeated for each frame of the video in which the overlay is to appear. Note that the overlay ad will be a static image ad if the same data is mapped into each frame of the main program, and a video ad if successive frames of a video segment are mapped into each frame of the main video program.

Audio mixing can also be performed in the digital domain. In one embodiment, the process of adding an attention alert audio track requires that the existing audio track to be extracted from the HANC and stored in a vector $\vec{x}$ in the stitcher 206's memory. The audio that is to be added can be stored in a similar vector $\vec{y}$, after which a vector summation is performed by stitcher 206 that stores the sum of each element of $\vec{x}$ and $\vec{y}$ in the corresponding elements of a result vector $\vec{z}$. Finally, the mixed audio track is written back to the original HANC location, replacing the original audio with the mixed audio. If the video format contains 30 frames per second, then 15 frames worth of audio would need to be processed in this manner to mix 500 milliseconds of attention alert audio into the program.

Most commercial stitchers use a graphics processing unit (GPU) to perform the transformations required for overlay insertion. Companies like NVIDIA and AMD make very capable GPUs that use pipelined arithmetic units to very efficiently perform the needed vector arithmetic. NVIDIA also has a proprietary technique for accelerating spatial anti-aliasing processing.

In this embodiment, the video stream that is output from the stitcher 206 is in the same HD SDI format that it received from the ad tag inserter 204. The main difference in the content of the video stream is that some of the SCTE 104 tags have been removed and the audio/video content referenced by the tags has been spliced into the stream.

The encoder 208 receives the HD SDI stream from the ad tag inserter 204 (or from the optional stitcher 206 if it is present), compresses it, and translates it into a format that is better suited for distribution to a variety of display device types and network speeds. During the conversion, the SCTE 104 tags are extracted from the blanking fields, converted to conform to the SCTE 35 specification, and embedded into the compressed stream. One embodiment of the encoder 208 uses MPEG-DASH, which is an adaptive bitrate streaming technique. The contents of a long program are broken down into a sequence of small fragments, each of which can be held by a small HTTP file segment. Versions are created that are optimized for a number of different network bandwidths. Each of the video files, along with associated metadata, are tracked and managed via a media presentation description (MPD). The MPD describes characteristics of each segment, such as video resolution and URL, and is updated in real time as the live streamed program progresses.

FIG. 3 describes an embodiment of the format of a record 300 from the ad database 203 that is used in conjunction with the ad tag formatter 202. The SEQ # field, or sequence number, is used as an index to retrieve a record 300 from the database 203. The SEQ # pointer in ad tag formatter 202 is incremented only after the ad tag formatter 202 uses the record 300 to create an ad tag based on the receipt of an imminent-feature-of-interest signal from the feature-of-interest detector 201. If a pending-feature-of-interest signal is received, the ad tag is created and sent to the ad tag inserter 204, but the SEQ # pointer is not incremented because the FOI may be cancelled. In this case, the same record 300 will be used to create an ad tag for the next feature of interest.

The RTB field of record 300 indicates whether the ad has been presold, or will be put out for a real time bid at some point further downstream in the infrastructure. "N" indicates the ad has been presold, while "Y" calls for real time bidding.

The SIZE field of record 300 specifies the horizontal and vertical size of the ad overlay that will appear on the screen after a feature of interest is detected. It is specified as a percentage of the overall screen size. Thus, the value "20× 10" indicates that the ad will be 20% as wide as the screen and 10% as tall.

The LOC field of record 300 specifies the location of the top, left corner of the ad overlay in terms of a percentage of the overall screen size. Thus, the value "50×80" indicates that the top, left corner will be halfway across from the left edge of the screen and 80% of the way down from the top edge of the screen.

The DUR field of record 300 field specifies the duration that the ad should run in seconds. Thus, "3" calls for a 3 second ad.

The ADVERTISEMENT URI field of record 300 provides the location where the ad media files can be found. The value will point to a file on the direct ad server 207 in cases where the ad is presold and the optional stitcher 206 is in use. It may point to a location on an agency ad server 405 when the ad is presold and the local stitcher 206 is not implemented. The value will be "Null" when the ad is destined to be sold via real time bidding.

The ALERT URI field of record 300 provides a similar function for the media file associated with the attention alert. If the ADVERTISEMENT URI is non-null and the ALERT URI is null, this indicates that the alert is an integral part of the ad and that a separate attention alert tag is not needed. In most cases, an ALERT URI will be provided when RTB="Y". The real time bidding process, if successful, will select a commercial that meets the requirements of an ad that can be shown while the viewers' attention has been enhanced by an alert.

However, for the foreseeable future, it will be difficult to use a tag to specify an attention alert that meets the needs of the process. So, in most embodiments, all RTB ads will have pre-selected alerts associated with them. If the owner of the media rights prefers a consistent alert process, they will all be the same. If a variety of alerts more successfully captures the viewers' attention, the database 203 can be populated with as many distinct URIs as desired, each representing a different sound, video, or haptic effect. Some embodiments will use the optional local stitcher 206 to embed the attention alerts in the video stream. For most embodiments, this will be a more reliable process than counting on it happening successfully at a downstream content server 402 or in a video player embedded in a viewer device (411, 412, or 413).

The FLAGS field of record 300 indicates the allowable media types for ads that are sold by real time bidding. In this embodiment, each bit position represents a media type (e.g., video, rich media, image). A value of "1" indicates the associated media type is acceptable for this ad, while a value of "0" prohibits its use. Thus, a value of "111" specifies that video, rich media, and image ads are all acceptable, while a value of "001" specifies that only a static image can be used. The value of this field is ignored for presold ads, which will take the format of the media file that is referenced by the ADVERTISEMENT URI field of record 300.

A combination of RTB="N", ADVERTISEMENT URI="Null", and ALERT URI="Null" indicates that no attention alert or advertisement should be associated with the current feature of interest. This will occur at the discretion of the video rights holder. For instance, a Major League Baseball game often includes more than 300 pitches. The league or the network might decide that fans would dislike the ads more than they like the reminder to look at the screen for an imminent pitch, and thus limit the attention alerts to one or two pitches per plate appearance. For this use case, the contents of the SIZE, LOC, DUR, and FLAGS fields of record format 300 will be ignored for the current database 203 record.

If the content owner decides that an attention alert without an ad would be valuable to their viewers, something similar to the following combination of values can be used:
RTB="N"
ADVERTISEMENT URI="Null"
ALERT URI=www.myalerts.com/alert001.

This would result in an alert tag being generated, with no presold ad tag, and no real time bidding to fill the ad slot.

Figure 4:
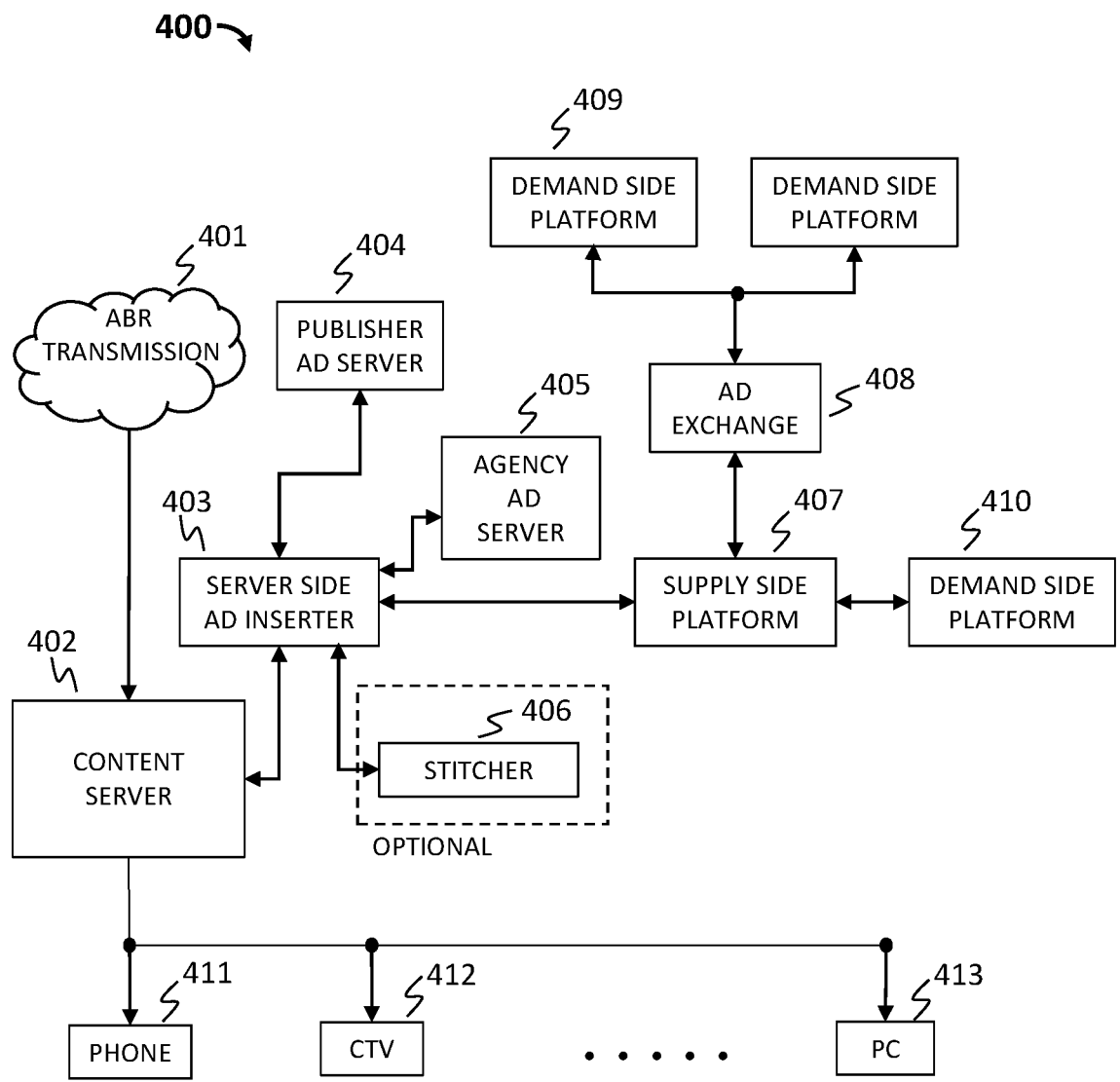
FIG. 4 is a block diagram of an embodiment of the system used to receive the ABR stream(s), extract the tags, send the programmatic ad tags out for real time bidding, receive the winning ad response, retrieve the media files for the programmatic ads and alerts plus any remaining non-programmatic ads and alerts, stitch the ads and alerts into the stream(s), and transmit the stream(s) to or toward the viewer display devices.

FIG. 4 is a block diagram 400 describing one embodiment of the downstream portion of the system used to transport the encoded ABR video to the viewers' video players (411, 412, or 413), replacing ad and alert tags with the associated media files as appropriate at each hop in the journey.

Several specialized pieces of hardware must work together in most embodiments to stitch the ads and attention alerts into the ABR video in the desired manner, including:

1. The server-side ad inserter (SSAI) 403 modifies the original manifest of the streaming video, potentially into a unique manifest for each viewer, given the presence of real time bidding for ads tailored to the known attributes of said viewer. To initiate this process, the SSAI 403 contacts its associated supply side platform (SSP) 407 whenever it encounters a SCTE 35 tag in the ABR video that calls for an RTB ad to be inserted.
2. The SSP 407 helps content providers manage and sell their advertising inventory most efficiently. They often help limit the number of times an individual sees a particular ad by trading information with demand side platforms. They also perform ad network optimization by tracking the price and volume characteristics for each ad network. They manage latency requirements by tracking their counterparts' performance in real time, and they match viewer and advertiser geographies to help select the most effective ads.
3. The ad exchange 408 is fundamentally a large collection of available ad impressions placed in the exchange by a potentially large number of publishers.
4. The demand side platforms (DSPs) 409 and 410 buy ad impressions for their customers who wish to advertise their products. They evaluate large numbers of impressions that are available in the ad exchanges 408 to which they are connected, and bid on the opportunities that match their customers' requirements.
5. Publisher ad servers 404 contain the media files for advertisers that have an especially close relationship with a publisher, or in this context, with the provider of the video.
6. Agency ad servers 405, in contrast, focus on the media files of those advertisers who have contracted with the agency. Recently, the distinction between the publisher and agency ad servers has diminished almost to the point where the two types of ad servers can merge.

Each content server 402 receives the ABR video transmission 401 with embedded SCTE 35 tags, either directly through a series of switches and routers or via an optional content distribution network.

The SSAI 403 parses the metadata of the incoming ABR video. When it recognizes a SCTE tag that references an ad, it first determines whether the ad is presold or if the impression needs to be sent to an ad exchange 408 for real time bidding. In some embodiments, the SSAI 403 formats the information in the tags that represent presold ads per the IAB VAST ad request requirements and sends the request to the SSP 407. For real time bidding, some embodiments format the ad request per the IAB OpenRTB spec and send it to the SSP 407.

For alerts, which in most embodiments never require real time bidding, a VAST ad request can be generated from the SCTE 35 tag if the alert was not inserted by optional stitcher 206. This will generally result in one of a small set of predefined audio files such as a chime or a harp glissando being retrieved from an ad server 404 or 405 and merged into the ABR stream.

While most advertisers would not allow their ads to be displayed along with another advertiser's distinctive audio messaging, some embodiments may opt to auction the alert slot instead of the commercial slot. Companies and brands like Aflac, Taco Bell, Intel, McDonalds, Hot Pockets, Green Giant, Farmers Insurance, and Nationwide have short audio logos with extremely high consumer recall. These logos could serve as the ultimate in low impact all-in-one alerts/advertisements as they serve to call attention to a feature of interest without requiring an overlay video track to present a visual message.

In some embodiments, the RTB ad requests are sent from content server 402 to an SSP 407 for analysis, then forwarded by the SSP 407 to the appropriate subset of ad exchanges 408 and demand side platforms 410 connected to the SSP 407. Each ad exchange 408 and DSP 409 and 410 performs an auction, and returns the best bid for the ad to the SSP 407. Some embodiments use a VAST format to communicate the bid.

The SSP 407 determines which bid is the best, and communicates the results back to the SSAI 403. The SSAI 403 retrieves the required media files from an ad server 404 or 405, and either stitches them into the ABR video or farms out the task to an attached stitcher 406.

In the case of presold ads, some embodiments send a VAST ad request from the SSAI 403 to an SSP 407, which retrieves the locations of the media files from an ad server 404 or 405. In other embodiments, the SSAI 403 retrieves the media files directly from an ad server 404 or 405 using one of the industry standard ad request formats. As in the RTB case, the media files are stitched into the ABR video by either the SSAI 403 or an attached stitcher 406. In both presold and RTB cases, the tags that generated the ads and alerts are removed from the video stream.

In some embodiments, a fraction of the embedded ad tags will not have resulted in a successful RTB auction. This may be due to a reserve price that was set too high, a policy decision to reserve some of the ad slots for client-side ad insertion, or other reasons. Those tags will be in the ABR video that is served to the viewing devices, whether connected TV 412, computer 413, phone 411, or other. The video players of these viewing devices will follow a similar procedure to that described for the servers of FIG. 4 in a last attempt to monetize the video.

Figure 5:
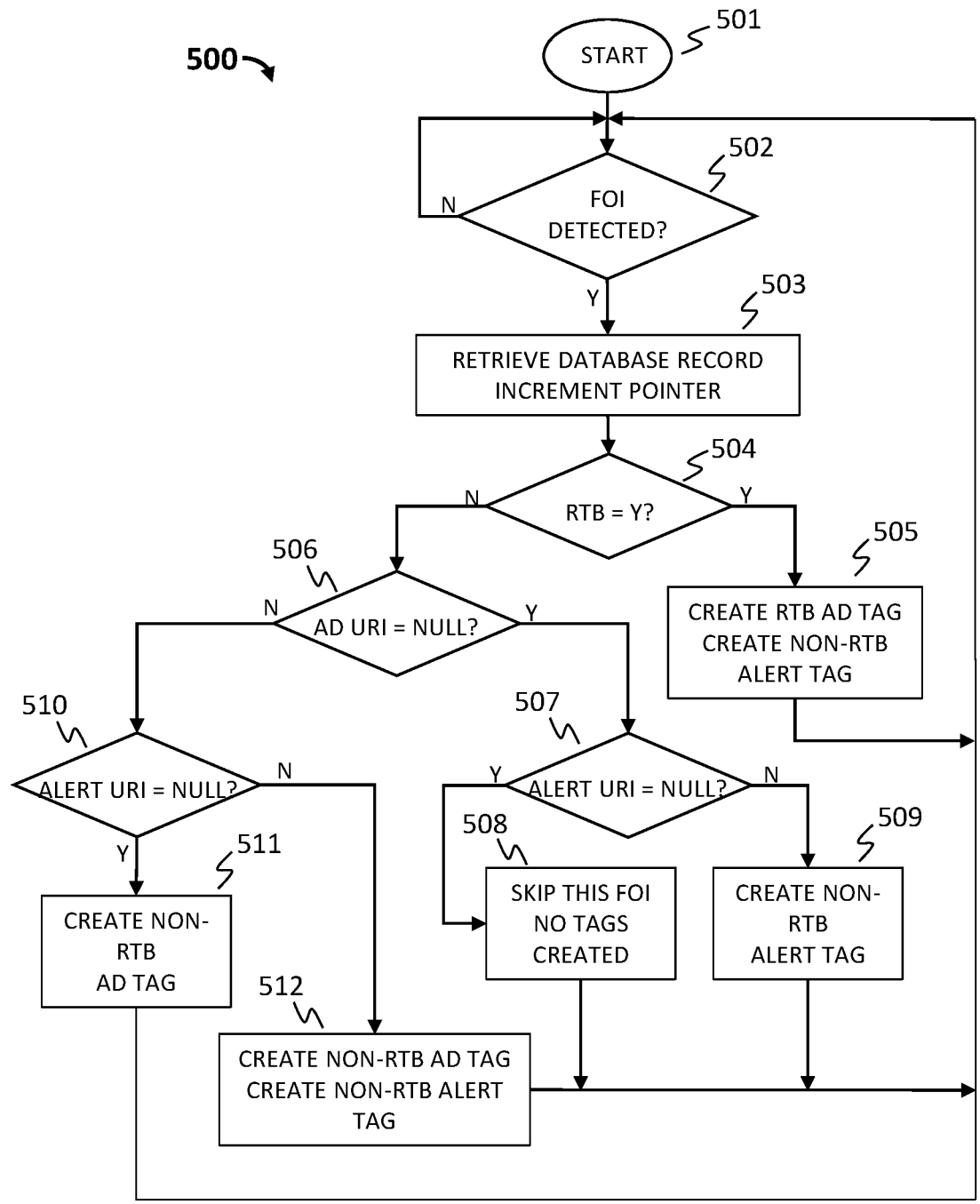
FIG. 5 is a flow chart that describes an embodiment of the process by which tags are created based on the contents of the latest record retrieved from the ad database that is connected to the ad tag formatter.

FIG. 5 is a flow chart 500 illustrating one embodiment of the process that ad tag formatter 202 uses in retrieving a record from the ad database 203 and using it to determine what types of ad tag and alert tag, if any, are needed in conjunction with the current feature of interest in the video program. After ad tag formatter 202 begins operating (in step 501), it enters a loop in step 502 in which it waits for a feature of interest to be detected.

When a feature of interest is detected by FOI detector 201, a database record 300 is retrieved from database 203 in step 503. If the FOI is of the "imminent" variety, the sequence number pointer in ad tag formatter 202 is incremented.

After the database record 300 is retrieved, the "RTB" field is examined in step 504. If the value is "Y", step 505 directs that the ad slot for this feature of interest should be filled using programmatic advertising with real time bidding to select the best fit for each viewer of the program. Thus, a tag is created that will cause the ad to be put out for auction by the appropriate server downstream in the infrastructure. For most embodiments, at least initially, RTB ads will not be available that include their own attention alerts. Therefore, a non-programmatic alert will be chosen from a set of standard alerts available on the local ad server, and a tag created to represent it.

If the "RTB" field has a value of "N", the ad tag formatter 202 checks the values of the "Ad URI" field in step 506 and the "Alert URI" field in steps 507 and 510. The appropriate actions for each combination of "Null" and non-null are described below.

If "Ad URI" contains "Null" and "Alert URI" contains "Null", step 508 indicates that the current feature of interest is to be skipped. No tags will be created, and no ads or alerts will be inserted into the video program to call attention to it. This might be done for some of the features of interest if the content owner decides that viewer backlash would occur if too many ads appeared during the programming.

If "Ad URI" contains "Null" and "Alert URI" contains a valid URI, step 509 indicates that a tag should be created for a non-programmatic alert with no accompanying ad tag. This could occur for one of at least two reasons. First, the content owner might feel that the alerts are helpful to the viewers, but an ad saturation point has been reached. In this case, a generic alert like a beep or a harp glissando would be used. Second, audio-only ads could have been sold to one of the companies that has a widely recognized sound logo. In this case, the alert would be serving as its own ad. Examples could include, the widely recognizable sound logos of Taco Bell, Aflac, Intel, Nationwide, Verizon, etc.

If "Ad URI" contains a valid URI and "Alert URI" contains "Null", step 511 indicates that a tag should be created for a non-programmatic advertisement, with no accompanying alert tag. In most embodiments, this combination indicates that the ad slot has been presold and that the chosen ad has an element that can serve as the alert.

If "Ad URI" contains a valid URI and "Alert URI" contains a valid URI, step 512 indicates that a tag should be created for a non-programmatic advertisement, with an accompanying alert tag. This most commonly indicates that an ad has been presold that does not have an element that can serve as its own alert. The alert will most often be a generic sound that does not compete for attention with the ad. However, special cases could occur in which the ad and the alert serve to reinforce each other's commercial messages. For example, the Intel sound logo and a Dell Computer visual logo could appear adjacent to the same feature of interest.

In addition to the embodiments that rely on long-time industry standards such as SCTE 35 and SCTE 104, embodiments can take more ad hoc approaches to accomplish the insertion of attention alerts and their associated commercial messages in conjunction with the occurrence of features of interest in a video program. For instance, Crystal Solutions has developed a method of sending metadata that is analogous to the SCTE 35 tags in a completely separate stream from the video program via a cloud connection. They use a proprietary "temporal fingerprint" technology to synchronize the metadata to the equivalent frame of the video program after the two flows are reunited downstream. In this approach, they sidestep the problems that can occur due to slightly different implementations of the standards that have evolved over time. As applied to the present invention, the information from the latest database record 300 would be sent along with the time code of the related feature of interest as a separate stream of metadata using the Crystal Solutions method. At any point in the distribution infrastructure short of the video player, the metadata would either be formatted into a SCTE 35 tag using the locally preferred dialect or used as-is to direct the insertion of the appropriate ads and alerts.

In similar fashion, rather than using the proprietary Crystal Solutions method, some embodiments use a separate, custom, cloud-delivered stream of metadata that includes the desired time code for each alert and ad along with the fields that describe what type of ad and alert is desired at each feature of interest. As the data referencing each ad or alert is parsed by a server downstream, it can be formatted into a SCTE 35 tag using the locally preferred dialect. The SCTE 35 tags are then inserted into the appropriate stream of the MPEG-TS live streamed program that needs to receive the ads and alerts.

Each MPEG-TS live stream can carry multiple substreams including separate ones for audio, video, closed captions, ad markers, etc., with each of them identified by a separate packet identifier (PID). In these embodiments, SCTE tags are reconstituted from the separately transported metadata streams and stitched into the ad marker substream of the MPEG-TS live stream.

Although various embodiments of the invention have been illustrated in the accompanying drawings and described in the above detailed description, it will be understood that the invention is not limited to the embodiments developed herein, but is capable of numerous rearrangements, modifications, substitutions of parts and elements without departing from the spirit and scope of the invention.

I claim:

1. A system for providing an alert on delivering a digital content, comprising:
a feature-of-interest detector that identifies suitable times to insert at least one of alerts and commercial messages into said digital content, an ad tag inserter for embedding metadata describing at least one of said alerts and said commercial messages into at least one of baseband video and encoded video representations of said digital content, an ad inserter for retrieving said metadata and using said retrieved metadata to embed at least one of said alerts and said commercial messages in said video, one or more viewer devices associated with one or more viewers, and a distribution network for transmission of said digital content coupling said ad tag inserter, said ad inserter, and said viewer devices;
wherein said digital content is an audio content or a video content, and said feature-of-interest detector initiates the placement of said alerts in said digital content for directing focus of one or more said viewers to one or more said viewer devices and said feature-of-interest detector initiates the placement of said commercial messages during delivery of said digital content, and wherein said alert is triggered on time to direct the focus of said viewer to an imminent occurrence of a feature of interest in said digital content being delivered, wherein said feature of interest comprises the resumption of play during a sporting event following a brief stoppage that was not caused by a change in the score, and wherein said commercial message is delivered at least partially during the time that said alert has caused said viewers' attention to be enhanced.

2. The system of claim 1, wherein said alert is an integral part of said commercial message, comprising at least one of a distinctive sound, a real or perceived increase in volume, a video effect, or a tactile stimulus effect.

3. The system of claim 1, wherein the temporal relationships are unconstrained between the start and end of said alert versus the start and end of said commercial message.

4. The system of claim 1, wherein said alert is at least one of an aural, a visual and a tactile stimulus alert.

5. The system of claim 1, wherein said ad tag describes a presold said commercial message that will be presented to all said viewers of said digital content.

6. The system of claim 1, wherein said ad tag describes a programmatic ad slot that will be filled with an advertisement that is selected via real-time bidding.

7. The system of claim 1, wherein said commercial message comprises at least one of an audio clip, a static logo, a photographic image, a drawing, a video message, an animated line drawing, a visual image displayed within a portion of the screen, a visual image briefly displayed using the full screen, a subliminal message, or a virtual message.

8. The system of claim 1, wherein said viewer device comprises at least one of a television receiver, a computer, an electronic tablet, a smart phone, a smart television, a virtual reality device, an augmented reality device, a virtual retinal display, or a bionic contact lens.

9. A method for providing an alert on delivering a digital content incorporated in a system comprising a feature-of-interest detector that identifies suitable times to insert at least one of alerts and commercial messages into said digital content, an ad tag inserter for embedding metadata describing at least one of said alerts and said commercial messages into at least one of baseband video and encoded video representations of said digital content, an ad inserter for retrieving said metadata and using said retrieved metadata to embed at least one of said alerts and said commercial messages in said video, one or more viewer devices associated with one or more viewers, and a distribution network for transmission of said digital content coupling said ad tag inserter, said ad inserter, and said viewer devices; wherein said digital content is an audio content or a video content, said method comprising the following steps: detecting an imminent feature of interest in said digital content, placing at least one ad tag in said digital content at a point in advance of said imminent feature of interest, subsequently replacing one such said ad tag with said alert for directing the focus of said viewer to the imminent occurrence of a feature of interest in said digital content being delivered, and replacing one such said ad tag with said commercial message that is presented to said viewer at least partially during the time said focus of said viewer has been directed to said feature of interest in said digital content, wherein the feature of interest comprises the resumption of play during a sporting event following a brief stoppage that was not caused by a change in the score.

10. The method of claim 9, wherein said alert is an integral part of said commercial message, comprising at least one of a distinctive sound, a real or perceived increase in volume, a video effect, or a tactile stimulus effect.

11. The method of claim 9, wherein the temporal relationships are unconstrained between the start and end of said alert versus the start and end of said commercial message.

12. The method of claim 9, wherein said alert is at least one of an aural, a visual and a tactile stimulus alert.

13. The method of claim 9, wherein said ad tag describes a presold said commercial message that will be presented to all said viewers of said digital content.

14. The method of claim 9, wherein said ad tag describes a programmatic ad slot that will be filled with an advertisement that is selected via real-time bidding.

15. The method of claim 9, wherein said commercial message comprises at least one of an audio clip, a static logo, a photographic image, a drawing, a video message, an animated line drawing, a visual image displayed within a portion of the screen, a visual image briefly displayed using the full screen, a subliminal message, or a virtual message.

16. The method of claim 9, wherein said viewer device comprises at least one of a television receiver, a computer, an electronic tablet, a smart phone, a smart television, a virtual reality device, an augmented reality device, a virtual retinal display, or a bionic contact lens.

* * * * *